United States Patent Office 3,434,144
Patented Mar. 18, 1969

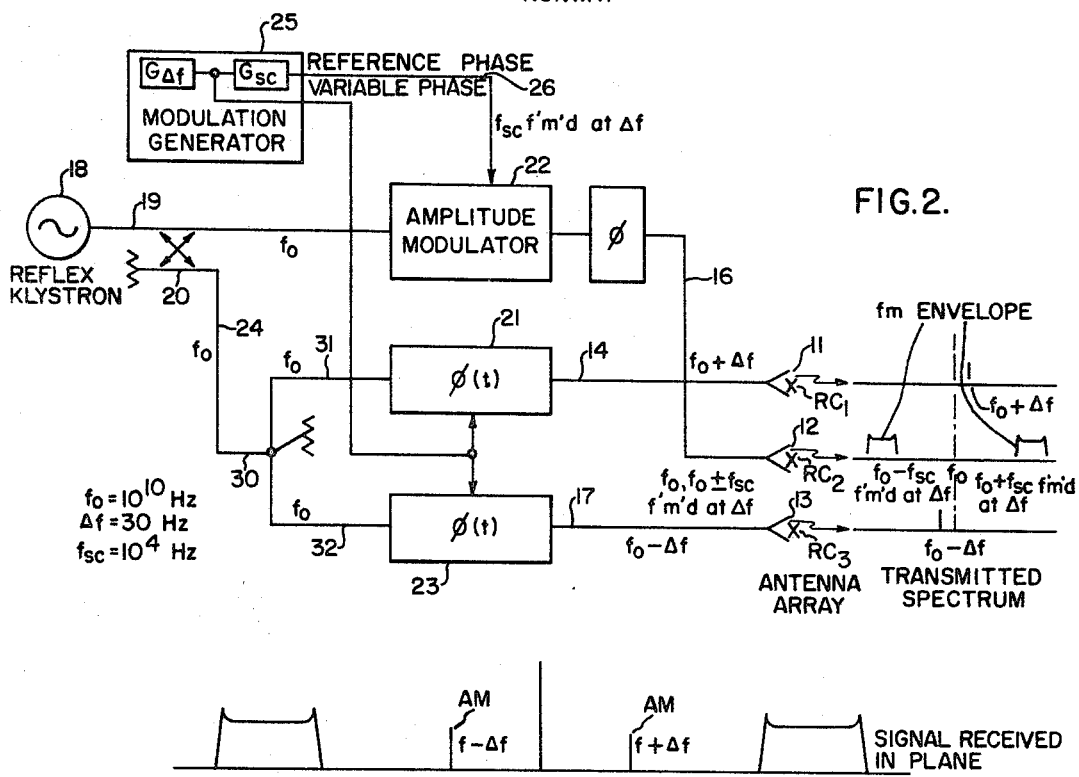

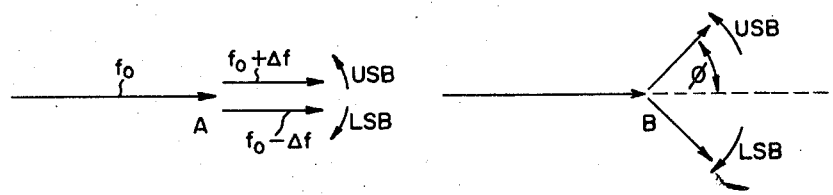
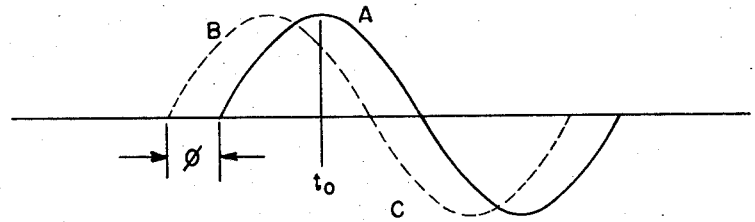
FIG.5.
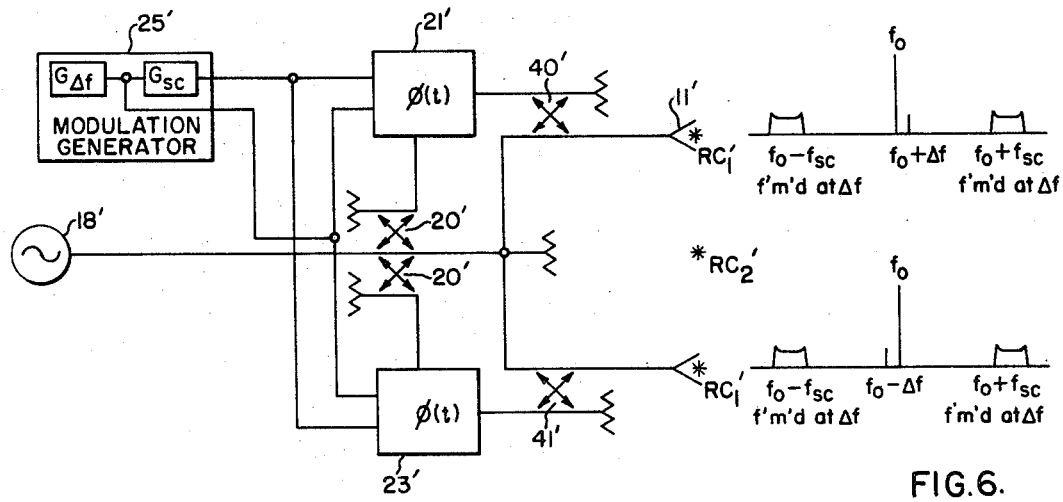
FIG.6.
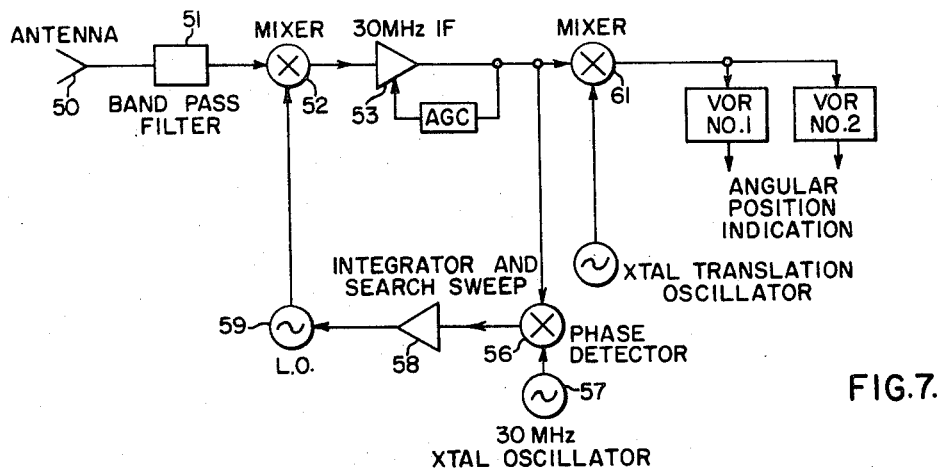
FIG.7.

3,434,144
PRECISION INTERFEROMETER NAVIGATION SYSTEM
Herbert Warren Cooper, Hyattsville, Md., assignor to Westinghouse Electric Corporation, Pittsburgh, Pa., a corporation of Pennsylvania
Filed Mar. 9, 1967, Ser. No. 621,892
U.S. Cl. 343—108      7 Claims
Int. Cl. G01s 1/18

ABSTRACT OF THE DISCLOSURE

A microwave interferometer precision navigation ground system utilizing a fixed linear array of a carrier antenna and sideband antennas, having their maxima in the same direction, in which the angle in space with respect to the location of the ground system is encoded upon a microwave carrier as an audiofrequency modulation whose phase, with respect to a reference phase, is advanced for angles on one side of the reference angle and retarded for angles on the opposite side. A carrier frequency, amplitude modulated by the same subcarrier frequency on which a reference phase has been frequency modulated, is radiated from the carrier antenna and only one sideband is radiated from each of the sideband antennas.

---

In the copending U.S. patent application Ser. No. 621,818 filed Mar. 9, 1967 in the name of Gerald I. Klein, owned by the assignee of this application, there is disclosed and claimed a frequency translation modulator that is preferably used herein. The modulator is a digitally-stepped ferrite phase modulator of the serrodyne type. The latter type modulator is well known and has been described in many publications, including among others, "The Serrodyne Frequency Translator," by R. C. Cummings, in the Proc. IRE, vol. 45, February 1957, pages 175 to 186, inclusive.

The particular phase modulator of said copending application is a multibit latching ferrite phase shifter with a suitable digital switching driver which produces accurate and uniform multiple step approximations to the ideal repetitive sawtooth wave function for producing the serrodyne phase modulation.

The uniformly stepped approximation of the sawtooth wave modulated phase shift obtained greatly suppresses the carrier and close-in sidebands and the large number of steps which that apparatus can produce without incurring high losses moves the unwanted sidebands far from the carrier. That modulator is particularly effective when used in the system of the present invention. However, as far as the basic inventive concept is concerned other types of frequency translation modulators could be used.

This invention relates to a precision electromagnetic navigation system of the interferometer type in which the ground system comprises a radiating system having at least two spaced antennas radiating simultaneously three electromagnetic wave signals including a modulated main carrier, an upper side band of which is radiated from one outer antenna and a lower sideband of which is radiated from the other outer antenna. As will appear later two embodiments of the ground system are illustrated and described. In one embodiment only two antennas are used with the reference carrier and one sideband being radiated from one antenna and the carrier and the other sideband being radiated from the other antenna. Accordingly, one sideband radiation pattern is centered on one antenna and the other sideband radiation pattern is centered on the other antenna. The interference carrier radiation from the two antennas forms a reference carrier radiation pattern centered on a line spaced equally from each antenna and parallel to the centerlines of the two sideband patterns. It should be stated here that the accuracy of this embodiment is dependent upon the amplitude of the carrier component being equal to or greater than the maximum vectorial sum of the amplitudes of the sideband components. This embodiment, although entirely practical and may be preferred in some installations because of greater simplicity does not cover as great an angle as the other embodiment which utilizes three antennas in which the reference component is transmitted only on a third antenna spaced at the midpoint between the two sideband antennas. In the subsequent description the three antenna system will be described first together with its operation after which the operation of the second embodiment will readily become apparent. The cooperating receiver in the aircraft demodulates the three signals and decodes the position information represented by the signals.

There are two fundamental elements in an electromagnetic navigation or guidance system—first, a source of radiated electromagnetic energy which has some characteristic which is a function of direction, and second, a means of encoding this information on a radiated electromagnetic wave beam and decoding it in the airborne vehicle.

Characteristics which can be used to provide this information are the frequency, phase, polarization, and amplitude of the carrier of the electromagnetic wave energy. Once the characteristic has been chosen to identify this information, there are different ways of modulating this electromagnetic wave energy to superimpose it on the carrier. In one class of systems an antenna beam is mechanically scanned by rotating the entire radiating aperture, or by maintaining the antenna fixed, but oscillating or rotating a primary feed in the aperture. The other class of system is that in which the modulation is accomplished electronically by causing the radiation phase, or amplitude, of individual antennas to vary while the antenna remains fixed. The present invention relates to the latter type of system.

Systems of the general type to which this invention relates are known as VOR, the latter being an acronym for very high frequency omnirange system. In these systems, the ground station component radiates an amplitude-modulated pattern with the phase of the modulation being referenced to north as a zero reference. Both sidebands of the amplitude-modulated main reference carrier are impressed on each of the two sideband antennas and the orthogonality of the antenna system in space is used together with a quadrature phasing of the RF energy to rotate an RF pattern at an audio modulation rate. In such a system, there is necessarily a one to one correspondence between the RF phase angle and the space direction angle.

The present invention utilizes a linear array including at least two fixed spaced radiating antennas in contradistinction to conventional VOR navigation systems previously mentioned. In the present invention the space angle information received in the aircraft is substantially the same as that in the VOR system, but in the former system the space angle information is encoded upon the transmitted carrier signal as an audio-frequency modulation by separating the sidebands from the carrier or by phase modulating a portion of the carrier and radiating the upper sideband from one outer antenna, radiating the lower sideband from the other antenna, with the carrier and a phase reference being radiated on a separate center antenna or being equally radiated on the outer antennas so that the effective center of radiation is midway between the two outer antennas. The difference in path length from the ground antennas to the antenna in the aircraft results in a microwave phase shift which is automatically translated into a shift of audio phase, which can then be measured precisely with conventional audio phase-measuring circuitry. Thus, from a precise audio measurement the microwave phase difference between each of the elements of the ground array is translated into a spatial angle, with respect to the reference angle, from the center of the array to the center of the airplane antenna. The zero reference for the phase displacement of the radiated sidebands is carried by the frequency modulated subcarrier which in turn is amplitude modulated with the frequency used to create the course sidebands. This reference subcarrier is demodulated in the airplane receiver and the phase of the frequency-modulated reference is compared with phase of the modulation from the course (angle) information signal.

The unique feature of the present invention is that by separating the sidebands and placing one course sideband only on each of the respective outer radiating antennas with the carrier being divided between the two sideband antennas in the one instance and being radiated from the center radiating antenna in the other instance, the limitation of the one to one correspondence between the RF phase angle and the space phase angle is eliminated. The phase reference is encoded by amplitude modulation of the carrier (or alternatively one of the course sidebands) by the frequency modulated subcarrier. As a matter of fact, with the present invention the ratio of the RF phase to the space phase can be 180 or greater as distinguished from the VOR system which is limited to unity.

From here on the description of the invention will be with reference to the details of three antenna embodiment after which reference will be made again to the two antenna system. As will be explained in greater detail hereinafter, in the present three antenna system the power at the carrier frequency, which may be designated $f_o$, is divided into three parts. By means of suitable signal translators between the carrier transmitter and the outer respective radiating antennas only, the upper sideband, $f_o + \Delta f$, is impressed upon the upper radiating element and the lower sideband, $f_o - \Delta f$, is impressed upon the lower radiating element. Also, modulation means between the transmitter and the center radiating antenna applies a subcarrier frequency, $f_{sc}$, which is frequency modulated at frequency $\Delta f$, the latter frequency being the amount of frequency translation added to and subtracted from the carrier and radiated from upper and lower radiating antennas respectively.

It will be seen that the use of the three radiating element ground sub-systems of the present invention to radiate the signal containing the angle and reference information is analogous to the conventional double-sideband amplitude-modulated system, which is conventionally used in broadcast applications. A double-sideband system is very tolerant of any misadjustments in the receiver. Since a precise measurement of the phase shift of the sidebands with respect to the carrier is required, this tolerance to receiver characteristics is extremely valuable. It is apparent by analogy that the system could be operated as a double-sideband suppressed-carrier system or a single-sideband system with reduced carrier. In either of these cases the reference modulation could be transmitted on one of the radiating elements in order to be able to make the phase measurements. The use of the three radiating elements also allows the slightly increased gain by virtue of the third element.

From the above it will be apparent that it is an object of the present invention to provide a novel and improved precision navigation system, in which the angular scale factor may be set as desired.

Other and further objects will become apparent from the following description when taken in consideration of the accompanying drawings in which:

FIGURE 1 is a schematic illustration of the environment in which the present invention may be used;

FIGURE 2 is a schematic block circuit diagram of which is referred to herein as the three antenna embodiment;

FIGURE 2A is a spectrum graph indicating the signal existing in the operational range of the system;

FIGURE 5 is a graph showing the relative phase of the signals transmitted from each of the antennas of the ground antenna;

FIGURE 6 is a block circuit diagram of a second embodiment, referred to as the two antenna embodiment; and FIGURE 7 is a simplified block circuit diagram of a receiver of the present system.

Figure 3:
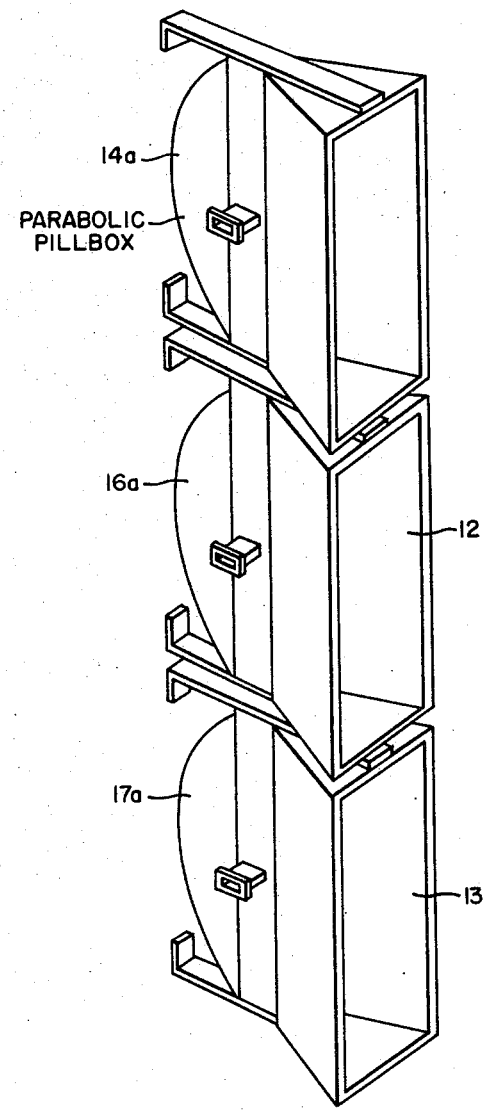
FIGURE 3 is an isometric view of the three antennas of the transmitting antenna array represented in FIGURE 2.

In the example of the background environment, illustrated in FIGURE 1, in which the present invention may be used, two transmitting antenna arrays 5 and 6 are shown, the antenna array 5 being adapted to transmit elevation course angle information in an instrument landing system for aircraft. Since such systems must provide both azimuth and elevation information it is apparent why two antenna arrays are used. This is only illustrative of a situation where the present invention could be used and since such landing systems are well known no detailed description need be given. Basically, the system for azimuth and elevation information are the same and operate in the same manner and therefore only one system will be described.

From what has been said previously it will be clear that the function of the ground-based sub-system in accordance with the present invention has the function of defining a time modulated radiation pattern such that the modulation existing at any point in the coverage section, whether it is azimuth or elevation, is a unique function of its angular position with respect to some known reference line. Subsequent processing of this modulation in the airbrone receiver determines the desired space angle information.

To complete the description of the present invention, further reference will be made only to that part of the ground-based sub-system which includes antenna array 5 which, in this case, is a linear array of separate radiating elements, the specific form shown being radiating horns 11, 12 and 13, coupled to their respective sources of electromagnetic wave energy through separate feed lines 14, 16 and 17, respectively. In this particular instance, the coupling between the feedlines and the respective horns is through devices known in the art as parabolic pill boxes 14a, 16a and 17a. The exact form of the radiating element constitutes no part of the invention and its selection for use in the system is arbitrary, except insofar that it is very essential for maximum accuracy, that the radiating elements be highly directional in the vertical plane to minimize ground reflections, and that the radiation patterns of each of the antennas coincide in space. The electrical length of all lines at carrier frequency $f_o$ between the microwave generator and the centers of radiation must be equal modulo $2\pi N$ radians, where N is any integer.

A common source of microwave energy for the three antenna array is the microwave generator or transmitter 18 and the microwave energy is supplied over a microwave guide 19 to separate modulators 21, 22 and 23. A portion of the carrier power at frequency $f_o$ is supplied directly to modulator 22 while another portion of the carrier power is supplied through a directional coupler 20 and a branch waveguide 24 and a magic-T coupler 30 and branch waveguides 31 and 32 to the modulators 21 and 23, respectively. The coupler 20 must be so adjusted so that the amplitude of the carrier component is equal to or greater than the maximum vectorial sum of the sideband components. The modulators 21 and 23 are actually frequency translators, or phase shifting devices, of identical construction. These modulators are preferably of the type described in said copending application, but may be of other suitable types. A modulation generator 25 comprises an oscillator $G_{\Delta f}$ which generates the 30 Hz. audio frequency, $\Delta f$, and an oscillator $G_{sc}$, which generates the 10 kHz. subcarrier frequency $f_{sc}$. It is apparent from the circuit diagram of FIGURE 2 that the audio frequency signal $\Delta f$, is supplied to the oscillator $G_{sc}$ and to frequency translation modulators 21 and 23. Accordingly, the sub-carrier oscillator $G_{sc}$ is frequency modulated at frequency, $\Delta f$, and in turn that portion of the carrier power at frequency $f_0$ supplied to the center antenna 12 is amplitude modulated with this frequency modulated sub-carrier.

The modulator 21 is adjusted to add the modulation frequency $\Delta f$, to provide the upper sideband frequency $f_0 + \Delta f$, and the modulator 23 is adjusted to subtract the frequency, $\Delta f$, to provide the lower sideband frequency, $f_0 - \Delta f$. A portion of the carrier power at frequency $f_0$ from the transmitter 18 is amplitude modulated in the modulator 22 by the reference phase signal appearing on the connection 26, that is, the output of the frequency modulated output of the oscillator $G_{sc}$, so that the antenna 12 receives and transmits signals $f_0$, $f_0 + f_{sc}$ f'm'd at $\Delta f$ and $f_0 - f_{sc}$ f'm'd at $\Delta f$, as illustrated in the graph of FIGURE 2. The subcarrier frequency $f_{sc}$ constitutes a reference modulation for the phase displacement of the radiated sidebands radiated from the antennas 11 and 13. As will be seen later, when this reference subcarrier is demodulated in the receiver in the aircraft, space angle information is obtained.

The modulators 21 and 23 may be of the Fox type, or any other appropriate type, which is capable of supplying the $\Delta f$ frequency translation.

Preferably, the frequency translation (phase modulation) modulators 21 and 22 are of the type described in the aforementioned copending patent application. The details of the amplitude modulator 22 for the center antenna 12 are not given because this modulator may be of conventional construction and conveniently may be of the semiconductor diode type.

The antenna array illustrated in FIGURE 3 has a radiation pattern in which the loci of constant phase of the radiated energy are cones about the axis containing the radiating elements of the system. In other words, the radiation pattern of the antenna of FIGURE 3 has its axis lying in the plane of the paper and coinciding with the axis of the center antenna 12.

Figure 4:
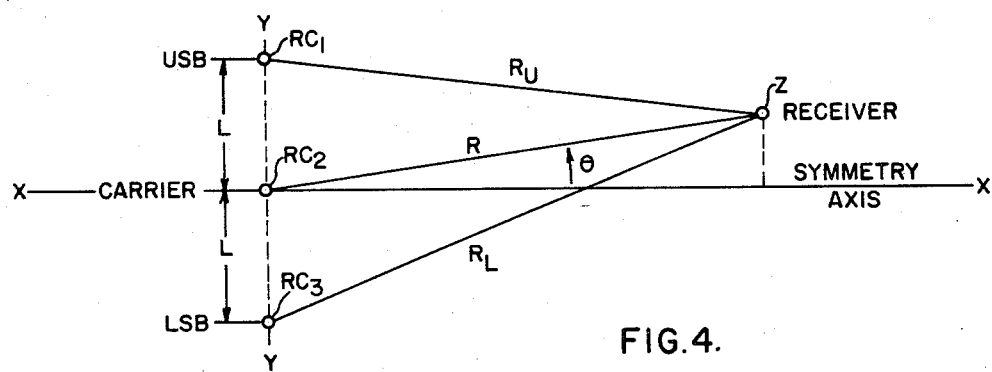
FIGURE 4 is a graphical representation of the antenna array geometry.

Referring now to FIGURE 4, assuming that the above type of antenna array is used, the nature of the modulation pattern in space may be determined by assuming that the phase centers of the three radiating antennas 11, 12 and 13 are on a straight line Y—Y, and that the centers of the outer radiating elements are separated by a distance L from the symmetry axis X—X and center of the center antenna 12. Angular position, $\theta$, of the receiver at X is measured from the axis of symmetry, X—X; that is, a line normal to the line Y—Y through the three radiation centers $RC_1$, $RC_2$ and $RC_3$ and passing through the center radiating antenna 12. The radiation centers $RC_1$, $RC_2$ and $RC_3$ are the centers of radiation of the antennas 11, 12 and 13, respectively. The axis of symmetry, X—X, is the reference axis for determining elevation angle, $\theta$, assuming that the ground sub-system is mounted for determining the elevation angle.

Although the system is not theoretically limited to any particular frequency, the wavelength does have a bearing on the selected frequency since the directivity that can be realized with a specified size radiating aperture is inversely proportional to the wavelength. For practical reasons a carrier frequency, $f_n$ in the X-band, at approximately 10 gHz., has been selected for a practical embodiment which has been constructed.

Referring to the operation of the present invention, it will first be assumed that the receiver is capable of decoding the elevation angle information which resides in the phase characteristic of the radiation from the center carrier antenna 12 and the two sideband antennas 11 and 13. Referring further to FIGURE 4, the lengths of the propagation paths $R_U$ and $R_L$ from the centers of the upper and lower sideband antennas 11 and 13, respectively, to the receiver at Z are calculated in terms of the path length R from the center O of the antenna array, at the intersection of the X- and Y-axes, the spacing between the centers (centers of radiation) of the two sideband antennas 11 and 13 and the angle $\theta$. Stated mathematically:

$$R_U{}^2 = (R \sin\theta - L)^2 + (R \cos\theta)^2$$
$$= R^2 - 2RL \sin\theta + L^2 \quad (1)$$

$$R_L{}^2 = (R \sin\theta + L)^2 + (R \cos\theta)^2$$
$$= R^2 + 2RL \sin\theta + L^2 \quad (2)$$

$$R_U, R_L = R\left[1 \mp 2\frac{L}{R}\sin\theta + \left(\frac{L}{R}\right)^2\right]^{1/2} \quad (3)$$

$$\approx R\left[1 \mp \frac{L}{R}\sin\theta + \frac{1}{2}\left(\frac{L}{R}\right)^2\right] \quad (4)$$

When the receiver is off the axis of symmetry, X—X, as in FIGURE 4, it will be apparent that $R_U$ does not exactly equal $R_L$. But for practical purposes the distance R between the transmitter, measured from $RC_2$, and the receiver at Z is very much greater than the distance L between the centers of each of the two sideband antennas 11, 13, and therefore the lengths of paths $R_U$ and $R_L$ can be considered to be approximately equal, but it is this small difference that we are measuring to determine angle information.

For the case where R is much greater than L, the paths $R_U$ and $R_L$ are essentially parallel and $\frac{1}{2} (L/R)^2$ can be neglected. If the receiver is on axis, X—X, $R_U$ is equal to $R_L$ and is approximately equal to R. As the receiver at Z moves above the axis of symmetry (in FIGURE 4), $R_U$ decreases by $L \sin\theta$ while $R_L$ increases by the same amount; for the angles below the axis of symmetry the opposite situation prevails.

Now consider the situation where signals are radiated from the three radiating antennas 11, 12 and 13 of the particular antenna array illustrated. As previously mentioned, center antenna 12 radiates the carrier at frequency $f_0$ (10 gHz.) carrying a sub-carrier at frequency $f_{sc}$, (10 kHz.), frequency modulated at the audio frequency $\Delta f$ (30 Hz). The modulator 21 is used to derive the upper course sideband, $f + \Delta f$, which is radiated from antenna 11 and modulator 23 is used to derive the lower course sideband, $f_0 - \Delta f$, which is radiated from the lower sideband antenna 13.

Now, assume the receiver at Z to be on the axis of symmetry X—X and the instantaneous phase of the two sidebands such that they add along the vector representing the carrier frequency $f_0$, as illustrated in the vector diagram of FIGURE 5 at A. In this vector diagram the long arrow $f_0$ on the left represents the carrier and the smaller upper and lower arrows represent the upper and lower sidebands $f_0 + \Delta f$ and $f_0 - \Delta f$, respectively. If the receiver moves transversely to the axis of symmetry X—X, each sideband path changes by $L \cdot \sin\theta$, as previously described, and the corresponding phase angle $\phi$, illustrated in FIGURE 5, at B and at C is given by:

$$\phi = \frac{2\pi L}{\lambda} \sin\theta \approx \frac{2\pi L \theta}{\lambda} \quad (5)$$

where $\lambda$ is the wavelength corresponding to the carrier frequency $f_0$ for small values of $\theta$ with the understanding that the modulation frequency is extremely small compared to the carrier frequency. In a practical embodiment of the present invention the carrier frequency $f_0$ used was approximately $10^{10}$ Hz., the frequency of the subcarrier $f_{sc}$ was $10^4$ Hz., and the audio frequency $\Delta f$ was 30 Hz.

In FIGURE 5 $t_0$ in the graph C is used as the time reference and the difference in angle of the vectors in A and B represent the relative phase between the reference sub-carrier frequency $f_{sc}$ and the sidebands at a given instant of time, but at different angular positions in space.

Both represent amplitude modulation of the same amount but the phase of the detected modulation phase of the lower sideband in B is advanced over that in A. This is for the condition where the receiver is at a point Z, above the axis of symmetry X—X, as indicated in FIGURE 4. If a point below the axis of symmetry were considered, a similar situation would exist, but the modulation phase would be retarded in comparison with that indicated at A. Thus, a fixed percentage of amplitude modulation exists over a given region of space, but the phase of the modulation is a unique function of the angular position of the receiver with respect to axis X—X. This is the heart of the present invention. This particular choice of antenna geometry and transmitted frequencies exhibits the unique property of translating a given microwave phase shift, due to a minor path length variation, directly into an identical phase shift at the modulation frequency. When the sub-carrier, $f_{sc}$, of the microwave carrier, $f_0$ containing the 30 Hz. reference phase is transmitted from the carrier radiating antenna 12, and the 30 Hz. course sidebands are transmitted from sideband radiating antennas 11 and 13 the airborne receiver can detect the composite signal, measure the actual modulation phase with respect to the reference phase on the sub-carrier and thereby compute the angle $\theta$; that is:

$$\theta = \phi \lambda / 2\pi L \quad (6)$$

Since, at a given point and space angle, $\phi$, can be measured only over the range plus or minus $\pi$ radians, there can be ambiguity in determination of $\theta$, and a multilobe pattern structure exists within the beam width of the individual radiating elements for $$L\lambda / > \frac{1}{2} \quad (7)$$

In order to appreciate the magnitude involved, assume that $\theta$ can be measured over the range $-\pi Z \phi Z \pi$, and in addition assume that the individual radiating antennas 11, 12 and 13 have the aperture L and are uniformly illuminated. This situation defines the largest individual element that can be used without overlap, and the narrowest beam width. Under these conditions the maximum off-axis angle that can be measured without ambiguity is given by:

$$\theta mz = \pm \frac{\lambda}{2L} \quad (8)$$

radians, while the first nulls in the pattern of the individual antenna elements are given by:

$$\phi \text{ null} = \pm \frac{\lambda}{L} \quad (9)$$

Therefore, the ambiguous angle measurement will exist over some portion of the antenna pattern, even for the most favorable conditions. This ambiguity may easily be resolved by using a second set of sideband antennas or a second carrier frequency and modulations to provide a fine-coarse system.

From the above analysis, it will be seen that if all parts of the system are perfect, the ability to measure the angular position, such as that of the receiver at position Z, is limited by the ability to measure the phase of the modulation signal. One of the salient features of the present invention is that it operates to make one spatial degree correspond to many degrees of electrical phase in order to obtain greater resolution, and the ratio is given by:

$$\frac{\text{Electrical degrees}}{\text{Spacial degrees}} = \frac{\phi}{\theta} = 2\pi \frac{L}{\lambda} \quad (10)$$

In designing such a system it is necessary to select a value of $L/\lambda$ such that, with the anticipated limitation in measuring phase, the required precision in that angular position can be obtained. As a practical example of parameters which will provide unambiguous angle coverage over a range of $\pm 0.7°$, a ratio of $L\lambda / \approx 40$ may be selected. This will yield a ratio of $\phi/\theta$ equal approximately to 250 so that a position measurement can be made to an accuracy of approximately 0.01 degree.

It should also be pointed out here that the term $\frac{1}{2}(L/R)^2$, previously shown in Equations 3 and 4, can have significant effects at short ranges since it represents an effective phase shift between the actual receiver carrier and that which would be effected on the basis of sideband information alone.

The inventive concept of the present invention has been described primarily in terms of a specific embodiment using a three antenna transmitting ground sub-system component. It should be apparent that certain departures from that specific embodiment may be made without departing from the spirit of the invention. For example, a second embodiment utilizing only two radiating antennas is shown in FIGURE 6 with corresponding components being indicated by primed reference characters to designate the components corresponding to similar components designated by the same unprimed reference characters in the three antenna embodiment. It is apparent that the only functual difference between the two embodiments is that, whereas the three antenna embodiment has three real centers of radiation, the two antenna embodiment has a virtual center of radiation for the carrier frequency corresponding to the center antenna 12 of FIGURE 2, but the other two real centers of sideband radiation are the same as in the three antenna embodiment.

It is believed that the operation of the two antenna embodiment is so apparent as not to justify detailed word description. However, it should be mentioned that the hybrid junction directional couplers 40 and 41 should be adjusted to maintain the relation between the amplitudes of the sidebands and the amplitude of the carrier within the limits previously mentioned in order not to reduce the precision of the two antenna embodiment.

It is apparent to one versed in the art that the fundamental requirement for radiating a carrier in which the phase is invariant with angle is that its center of radiation must be at the center and on the line joining the sideband antennas. Widest angular coverage is realized by an antenna located at the center which has a radiation pattern as a function of angles which is identical with those of the sideband antennas. However, by connecting the sideband antennas as a cophased array it is apparent that its center of radiation meets the symmetry requirements.

However, whereas in the three antenna embodiment the percentage of modulation of the carrier by the course sidebands is invariant with angle, in the two antenna embodiment the carrier pattern in the plane of angle measurement is sharper by the amount of the array factor. Thus, as the receiver in the aircraft moves off the line normal to the array (which is the direction of the maximum of the carrier) the carrier decreases and thus the modulation percentage increases. The usable coverage angle is the sector in which the sum of the sideband voltage vectors remains equal to or smaller than the carrier voltage vector.

It should be noted further that although the preferred embodiment will probably be that in which the sub-carrier is modulated upon the carrier which is the largest signal. However, the system would work equally as well if the reference sub-carrier were transmitted on one of the sideband antennas.

The particular receiver sub-system illustrated in FIGURE 7 constitutes no part of this invention, per se, except insofar as some receiver must be provided to complete the system and to give utility to the ground-based transmitter sub-system which is the subject of this invention. To review again, it is the function of the airborne receiver sub-system to receive the microwave signal energy radiated by the three radiating antennas 11, 12 and 13, demodulate these signals to recover the ground reference position-dependent modulation, and process this data to provide position information in a form suitable for recording or indication to the pilot. Consequently, the airborne receiver sub-system must provide circuits for automatic acquisition and tracking of the transmitted signals to insure proper reception of signals as well as to provide demodulation of the reference information and course information and measure the phase difference between the two.

Referring again to FIGURE 2 it will be seen that the upper sideband antenna 11 transmits a spectral line at the upper sideband frequency $(f_o+\Delta f)$ while the other sideband radiating antenna 13 radiates the lower sideband frequency $(f_o-\Delta f)$. On the other hand, the center antenna 12 transmits the carrier $f_o$ and two 10 kHz. sidebands which are frequency modulated at the frequency $\Delta f$. The receiver sub-system must receive simultaneously all of these signals, indicated in FIGURE 2(A), and process them in order to decode the position information which is coded into these three signals at the transmitter.

In the simplified block diagram of the receiver in FIGURE 7, the receiver includes the conventional antenna 50, from which the received signals are supplied through a band-pass filter 51 to a mixer 52. The mixer 52 is in a phase-lock loop which includes an IF strip 53, a second mixer 56 into which is fed a master reference frequency from a crystal controlled oscillator 57, an amplifier 58 and a third local oscillator 59. The IF strip 53 is provided with suitable AGC controls. The output of the IF strip 53 will be compared with the output of the crystal controlled oscillator 57 in a phase detector 56 and the resulting output is amplified and supplied to the local oscillator 59, the output of which is supplied to the mixer 52 to complete the phase-lock loop. This portion of the system is quite conventional. If the local oscillator 59 was operating at a frequency less than the bandwidth of the phase-lock loop away from its correct frequency, then locking would be automatic when the desired signal is received. Since open loop control to this degree is not likely, the local oscillator 59 will initially be offset to one side of the proper frequency and a search sweep in the integrator circuits will be used to sweep the local oscillator frequency until the proper value is received, at which point the circuit will lock and the sweep will stop. This insures positive automatic tuning. The output from the IF strip also goes to another mixer 61 where it is translated in frequency to approximately 115 mHz. to feed the VOR receivers, from which angle information is derived in conventional manner.

I claim as my invention:

1. A navigation system comprising an antenna array having a plurality of radiating elements producing at least three centers of radiation, carrier wave generator means for supplying carrier wave energy to the elements of said array for transmitting simultaneously at least three separate electromagnetic wave signals, all having the same base carrier component, said means for supplying electromagnetic wave energy to the elements of said array including phase modulation means for supplying at least one sideband above the frequency of said carrier on one element of said array on one side of the carrier radiation center and at least one sideband below said carrier frequency on another element of said array, on the opposite side of the center of carrier radiation, means for generating a subcarrier, means for frequency-modulating said subcarrier in time coherence with the phase modulation of said main carrier to produce upper and lower sidebands of said subcarrier, and means for impressing said modulated subcarrier on said main carrier.

2. The combination as set forth in claim 1 in which said antenna array includes two radiating elements.

3. The combination as set forth in claim 2 in which the upper sideband of said carrier and the upper and lower sidebands of said subcarrier are radiated from one antenna element and the lower sideband of said carrier and the upper and lower sideband of said subcarrier are radiated from the other antenna element.

4. The combination as set forth in claim 1 in which said antenna array includes two outer radiating elements and an intermediate radiating element.

5. The combination as set forth in claim 4, in which the upper sideband of said carrier is radiated from one of the outer antenna elements of said antenna array, the lower sideband of the carrier is radiated from the other outer antenna element, and the upper and lower sidebands of said subcarrier are radiated from said intermediate antenna element.

6. The combination as set forth in claim 1 in which said phase modulation means for creating sidebands on said carrier are respective serrodyne modulators.

7. The combination as set forth in claim 6, in which said serrodyne modulators are microwave latching ferrite digital phase shifters in which the phase of the microwave energy is stepped through uniform steps and returned to zero by a digital approximation to a phase variation which is a sawtooth function of time.

References Cited

UNITED STATES PATENTS

| | | | |
|---|---|---|---|
| 2,430,244 | 11/1947 | O'Brien | 343—105 |
| 3,048,842 | 8/1962 | Parker et al. | 343—108 |
| 3,111,671 | 11/1963 | Thompson | 343—105 X |
| 3,287,727 | 11/1966 | Earp. | |
| 3,346,860 | 10/1967 | Earp | 343—105 |
| 3,369,237 | 2/1968 | Cronkhite | 343—105 |

RODNEY D. BENNETT, JR., *Primary Examiner.*

MALCOLM F. HUBLER, *Assistant Examiner.*